(12) United States Patent
Annampedu et al.

(10) Patent No.: US 7,082,005 B2
(45) Date of Patent: Jul. 25, 2006

(54) SERVO DATA DETECTION IN THE PRESENCE OR ABSENCE OF RADIAL INCOHERENCE USING DIGITAL INTERPOLATORS

(75) Inventors: Viswanath Annampedu, Allentown, PA (US); Pervez Mirza Aziz, Garland, TX (US)

(73) Assignee: Agere Systems Inc., Allentown, PA (US)

(*) Notice: Subject to any disclaimer, the term of this patent is extended or adjusted under 35 U.S.C. 154(b) by 415 days.

(21) Appl. No.: 10/228,548

(22) Filed: Aug. 27, 2002

(65) Prior Publication Data

US 2003/0095350 A1 May 22, 2003

Related U.S. Application Data

(60) Provisional application No. 60/335,143, filed on Oct. 24, 2001.

(51) Int. Cl.
*G11B 5/09* (2006.01)
*G11B 20/10* (2006.01)

(52) U.S. Cl. .............................. 360/51; 360/39; 360/46
(58) Field of Classification Search .................. 360/39, 360/46
See application file for complete search history.

(56) References Cited

U.S. PATENT DOCUMENTS

| | | | | |
|---|---|---|---|---|
| 5,696,639 | A * | 12/1997 | Spurbeck et al. | 360/51 |
| 6,775,084 | B1 * | 8/2004 | Ozdemir et al. | 360/55 |
| 6,788,484 | B1 * | 9/2004 | Honma | 360/51 |
| 6,816,328 | B1 * | 11/2004 | Rae | 360/51 |

OTHER PUBLICATIONS

U.S. Appl. No. 09/338,104, filed Jun. 23, 1999, P.M. Aziz, "Rate (M/N) code Encoder, Detector and Decoder for Control Data".

* cited by examiner

*Primary Examiner*—Wayne Young
*Assistant Examiner*—Daniell L. Negron

(57) ABSTRACT

Techniques for detecting data, such as servo data, from input or incoming data read from a transmission medium, such as magnetic recording medium, in the presence or absence of radial incoherence. In one illustrative recording medium-based aspect of the invention, such a technique for detecting data from input data stored on a recording medium comprises the following steps. First, one or more samples are interpolated from one or more samples which have been generated from the input data at a given symbol rate. The one or more interpolated samples have one or more phases associated therewith which differ from a phase associated with the one or more samples generated at the given symbol rate. Then, an optimum or best phase is selected from the symbol rate phase and the one or more interpolated phases such that at least a portion of the one or more samples associated with the optimum phase are identified as representative of detected data.

24 Claims, 12 Drawing Sheets

SERVO DATA DETECTION IN THE PRESENCE OR ABSENCE OF RADIAL INCOHERENCE USING DIGITAL INTERPOLATORS

CROSS REFERENCE TO RELATED APPLICATION

The present application claims priority to the U.S. provisional patent application identified by U.S. Ser. No. 60/335,143, filed on Oct. 24, 2001, and entitled "Methods for Improving Servo Data Detection Performance in the Presence of Radial Incoherence," the disclosure of which is incorporated by reference herein.

FIELD OF THE INVENTION

The present invention generally relates to techniques for use in magnetic recording systems and, more particularly, to techniques for performing servo data detection in the presence or absence of radial incoherence.

BACKGROUND OF THE INVENTION

A read channel integrated circuit (IC) is one of the core electronic components in a modern magnetic recording system such as a hard disk drive. A read channel converts and encodes data to enable the heads to write data to the disk drive and then read back the data accurately. The disks in a drive typically have many tracks on them. Each track typically consists of mostly user or "read" data sectors, as well as control or "servo" data sectors embedded between the read sectors. The servo sectors help to position the magnetic recording head on a track so that the information stored in the read sectors is retrieved properly.

A typical magnetic recording system includes some mechanism for detecting servo data. However, a problem that inhibits the ability of such a detecting mechanism to reliably detect servo data during a disk seek is a condition referred to as "radial incoherence." Radial incoherence (RI) refers to the offset in timing between radially adjacent servo tracks. From a signal processing point of view, quick phase changes and some signal loss are characteristics of RI.

Thus, in magnetic recording systems, there is a need for techniques which improve servo data detection performance in the presence of radial incoherence.

SUMMARY OF THE INVENTION

The present invention provides techniques for detecting data, such as servo data, from input or incoming data read from a transmission medium, such as magnetic recording medium, in the presence or absence of radial incoherence. More specifically, the techniques of the invention employ interpolation in the detection of such data.

In one illustrative recording medium-based aspect of the invention, such a technique for detecting data from input data stored on a recording medium comprises the following steps. First, one or more samples are interpolated from one or more samples which have been generated from the input data at a given symbol rate. The one or more interpolated samples have one or more phases associated therewith which differ from a phase associated with the one or more samples generated at the given symbol rate. Then, an optimum or best phase is selected from the symbol rate phase and the one or more interpolated phases such that at least a portion of the one or more samples associated with the optimum phase are identified as representative of detected data.

Such servo detection techniques offer several orders of magnitude in performance improvement in detecting servo data in the presence of RI and may advantageously be employed in a read channel integrated circuit. Furthermore, such techniques may be applied to any servo encoding system.

Advantageously, for a given level of performance, the servo data detection techniques of the present invention improve seek time in magnetic recording systems. That is, since the techniques of the invention handle radial incoherence effectively, faster disk seeks are possible. Also note that for a given level of performance, tracks can be written closer and the disks can be spun faster with the application of techniques of the present invention. Thus, as will be explained in detail below, the invention advantageously exploits the use of interpolation in the presence of quick phase changes in order to provide improved servo data detection performance.

It is to be understood that since writing data to, storing data in, and reading data from a magnetic recording medium may be considered a transmission channel (medium) that has an associated frequency response, the techniques of the present invention are more generally applicable to any digital transmission systems such that detection of digital data represented by a sequence of symbols, where each symbol may be made up of a group of bits, may be improved.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative magnetic recording system embodiment. However, it is to be understood that the present invention is not so limited. Rather, as will be evident, the techniques of the invention may be more generally applied to improve digital data detection in any data encoding system or, more generally, in any digital transmission system, in the presence or absence of sampling phase incoherence.

The detailed description will first describe and illustrate an exemplary magnetic recording system employing a servo encoding system which may be modified to implement the techniques of the present invention in order to mitigate and/or eliminate the effects of RI. The detailed description will then describe and illustrate a magnetic recording system and associated techniques for use therein in accordance with embodiments of the present invention.

Figure 1:
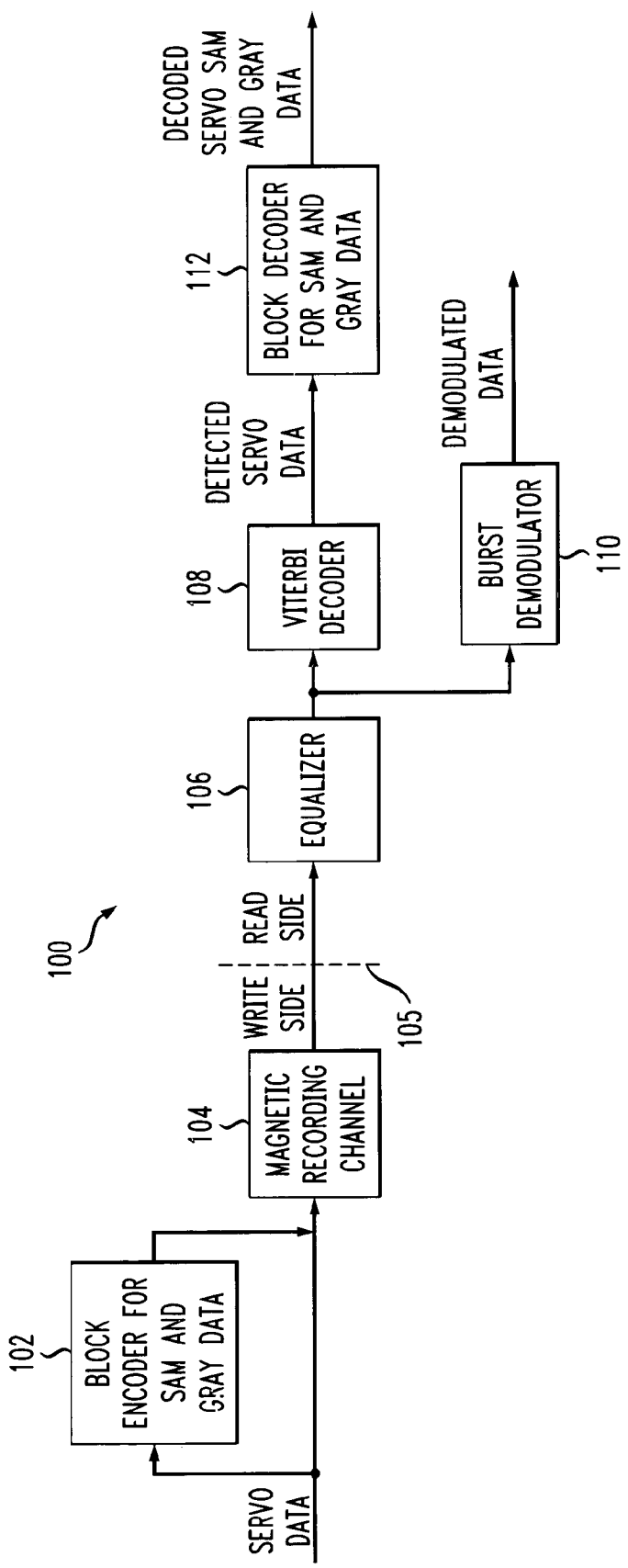
FIG. 1 is a block diagram illustrating an exemplary magnetic recording system which may be modified to implement the techniques of the present invention.

Referring initially to FIG. 1, an exemplary magnetic recording system is illustrated, particularly focusing on the components involved in servo data processing, which (as will be further explained and illustrated) may be modified to implement the techniques of the present invention. As shown, a magnetic recording system 100 may comprise a servo data block encoder 102, a magnetic recording channel 104, an equalizer 106, a Viterbi decoder 108, a burst demodulator 110, and a servo data block decoder 112. As is known, magnetic recording systems such as the one illustrated in FIG. 1 employ digital signal processing to detect servo data, as compared with older systems which employ analog techniques.

Figure 2:
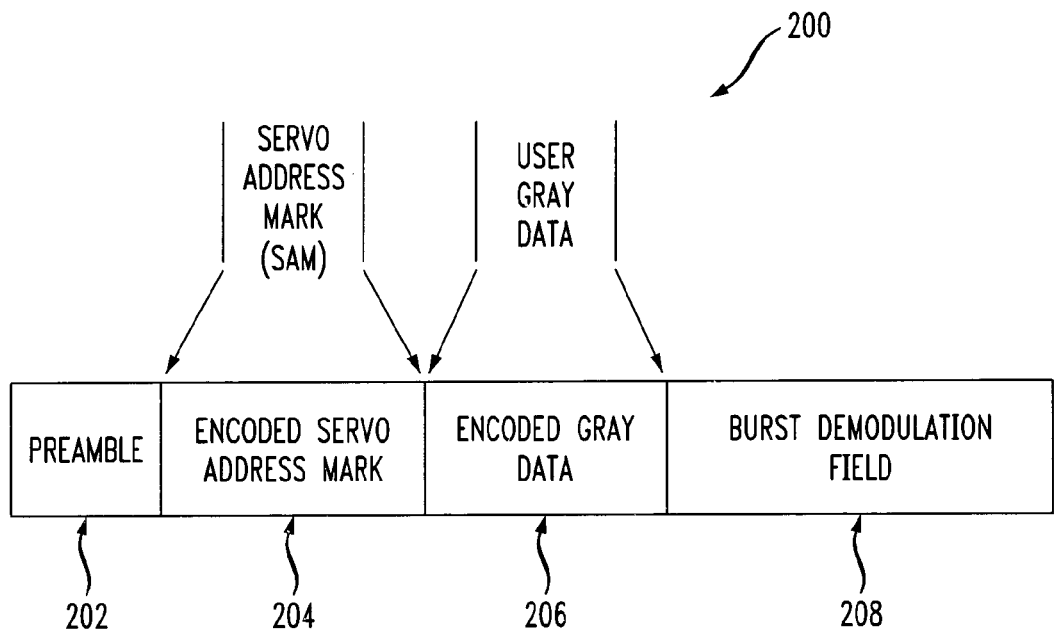
FIG. 2 is a diagram illustrating a servo data format.

FIG. 2 illustrates a data format 200 of a servo sector. As shown, a servo sector may comprise a preamble 2T pattern 202 which allows the system to recover the timing and gain of the written servo data. The preamble is typically followed by a servo address mark (SAM) 204 which is the same for all servo sectors. The SAM is then followed by encoded servo Gray data 206. The Gray data is followed by several burst demodulation fields 208.

The SAM 204 typically comprises some fixed number of bits. The Gray data 206 represents the track number/cylinder information and serves as a coarse positioning for the magnetic head of the recording system. The burst demodulation fields 208 serve as a fine positioning system for the head to be on track.

Thus, with reference back to FIG. 1, on the write side of operations, servo data is encoded by the block encoder 102 and written to a magnetic medium such as a disk (denoted as 105) via the magnetic recording channel 104. Portions of the servo data that are not encoded may also be written to the medium 105. It is understood that a magnetic write head, while not expressly shown, is functionally interposed between the magnetic recording channel 104 and the magnetic medium 105 for writing data to the medium. On the read side of operations, the servo data is read from the magnetic medium 105 via a magnetic read head (not expressly shown but understood to be functionally interposed between the medium 105 and the equalizer 106) and then equalized in accordance with the equalizer 106. The servo data is then sampled at a nominal sampling rate (not shown) and detected by the Viterbi decoder 108. The Gray data portion of the detected servo data is then decoded by the block decoder 112, while the burst demodulation field portion of the servo data is demodulated by the burst demodulator 110.

As mentioned above, RI inhibits the ability of a data detector such as the Viterbi decoder 108 to reliably detect SAM and Gray code during a seek. Again, RI refers to the offset in timing between radially adjacent servo tracks and, from a signal processing perspective, is characterized by quick phase changes and some signal loss.

Figure 3:
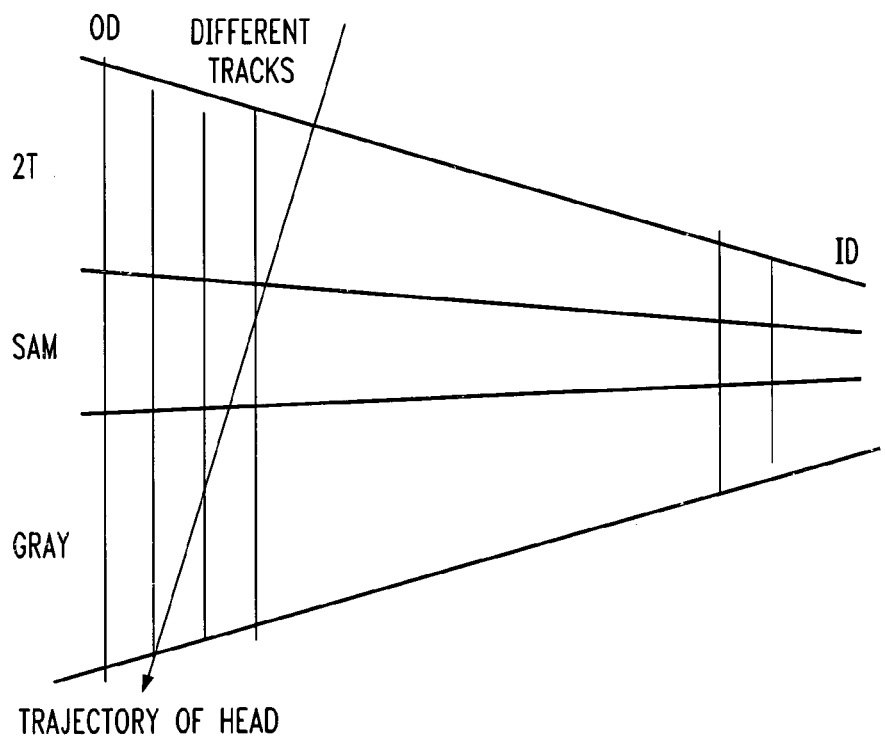
FIG. 3 is a diagram illustrating trajectory of a magnetic head during a seek mode.

The higher the velocity of a "seek," the more the adverse effects of RI. The trajectory of a head while seeking is illustrated in FIG. 3. Evident from this figure is the fact that the head picks up signals from adjacent tracks. As shown, "ID" refers to the inner diameter and "OD" refers to the outer diameter of the circular magnetic disk. The vertical lines represent different servo tracks. The slanting line with an arrow represents the path or trajectory that the magnetic head would see over time when the disk is spinning. The greater the velocity of the spin, the greater the slope of this line. As can be seen from the figure, since the head crosses different tracks over time, the head picks up signals from those different tracks.

Figure 4:
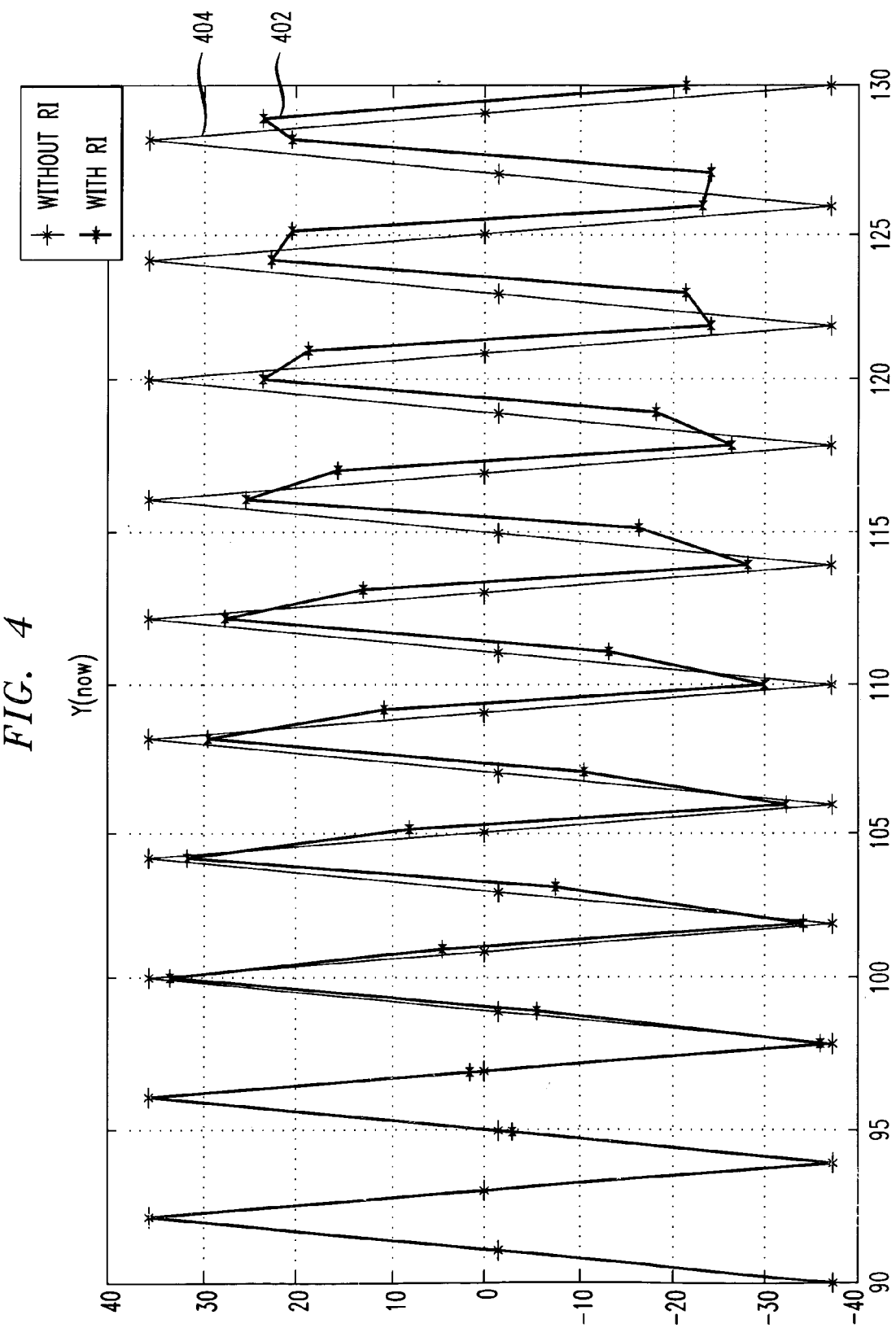
FIG. 4 is a diagram illustrating an input data signal with and without the effects of radial incoherence.

Quick phase changes occurring due to the effects of RI are illustrated in FIG. 4. It can easily be seen how the phase changes due to RI, illustrated by curve 402, as compared with an unimpaired signal, illustrated by curve 404. As shown in FIG. 4, to the extreme left of the graph, both curves (samples) 404 and 402 are on top of each other. As time progresses (to the right of the graph), the samples differ. Specifically, the samples differ because of the change in the sampling phase due to RI.

Faster seek times can be achieved in disk drives by increasing the servo track density (i.e., tracks are closer for higher density) and/or higher rotational speed of the disk (i.e., head moves faster over servo tracks). However, as the track density and the spin velocity increase, the effects of RI also increase.

A servo encoder in a magnetic recording system may map M input bits to N output bits. Thus, one can make use of the constraints imposed by the servo encoder and attempt to design an optimal detector based on those constraints to decode the servo data. A partial response maximum likelihood (PRML) detector also known as a Viterbi decoder (e.g., Viterbi decoder 108 in FIG. 1) is a well-known, widely used detector for decoding the encoded servo data. Other detectors for servo data may include peak detectors where the location and polarity of the peak (which are dependent on servo encoder constraints) serve to decode the data. These detectors yield very good performance when they use properly sampled signals for detecting the bits. However, the performance of these detectors degrades significantly when the samples are taken with timing errors.

For example, an M/N servo data encoder of a magnetic recording system is described in the U.S. patent application identified as Ser. No. 09/338,104, filed on Jun. 23, 1999, and entitled "Rate (M/N) Code Encoder, Detector, and Decoder for Control Data," the disclosure of which is incorporated by reference herein. While such an encoded PRML digital servo may perform satisfactorily in the absence of RI, performance degrades significantly when RI is present due to a lack of properly timed samples for detection.

Let us assume an EPR4 [5 5–5–5] partial response as a target response, and that M is 2 and N is 8. The ideal values (after equalization, sampling and digitizing) corresponding to the preamble, and the 2/8 encoded servo data are given below in Tables 1 and 2 for an EPR4 [5 5–5–5] targe partial response. Note that these are the ideal sample values for 'T' symbol rate sampling of the equalized analog waveform.

TABLE 1

Preamble and corresponding A/D output stream
(Ideal Y Values)-EPR4 2/8

| Preamble | Y1 | Y2 | Y3 | Y4 |
|---|---|---|---|---|
| 11001100 | 0 | 20 | 0 | −20 |

TABLE 2

Data and corresponding A/D output stream
(Ideal Y Values)-EPR4 2/8

| Input bits | Coded bits | Y1 | Y2 | Y3 | Y4 | Y5 | Y6 | Y7 | Y8 |
|---|---|---|---|---|---|---|---|---|---|
| 00 | 00111100 | X | X | X | 20 | 10 | 0 | −10 | −20 |
| 11 | 11000011 | X | X | X | −20 | −10 | 0 | 10 | 20 |
| 01 | 00001111 | X | X | X | 0 | 10 | 20 | 10 | 0 |
| 10 | 11110000 | X | X | X | 0 | −10 | −20 | −10 | 0 |

In Table 2, X denotes that those values are dependent on the previous two input bits.

The preamble part of the servo field is used for acquiring the timing information by a digital phase lock loop (DPLL). After the preamble, the DPLL tracks the timing information during the servo data field. The 2/8 encoded SAM and Gray data is detected by a partial response maximum likelihood detector (Viterbi decoder) using the constraints imposed by the 2/8 encoder to improve reliability of the detected bits.

As described in the above-referenced U.S. patent application identified as Ser. No. 09/338,104, the relationship between the Viterbi trellis forcing phase sequence and the data stream has to be determined and initialized properly. Such a Viterbi trellis synchronization can be done easily by inserting a small number of pad bits between the preamble and SAM and detecting the end of the preamble. The end of the preamble can be detected simply and reliably by taking a filtered version of the received samples and performing a threshold detection on the filtered version.

However, conventional DPLLs cannot react to quick phase changes resulting from RI due to implementation latencies. With increasing seek speeds and hence increasing effects of RI, it is clear that a DPLL can not handle the RI problem. Even when a good signal-to-noise ratio (SNR) is available, current systems can not make use of such an SNR as these systems are limited because of RI and not by noise.

The present invention realizes these problems and provides techniques which effectively address them. As will be illustratively explained in detail below, the techniques of the invention employ interpolation to assist in choosing an optimum sampling phase associated with input data read from a magnetic recording medium. In this manner, the adverse effects of RI are mitigated and/or eliminated.

The present invention also realizes that a servo channel employing a data detector such as a sequence detector or Viterbi detector needs to be synchronized to the block boundaries of the incoming data. Imperfect sampling due to RI can destroy this synchronization as well as corrupt the quality of the samples used for detection. The mis-synchronization to the block boundaries is the dominant effect which affects the performance of the servo SAM detection.

Accordingly, the present invention overcomes the effects of RI by employing one or more digital interpolators for generating samples at one or more time instances that fall between samples that correspond to time instances of the symbol rate. At the code word boundary (Nth bit for an M/N encoder), the inventive technique locks on to the best possible phase (optimum phase) based on the constraints imposed by the encoder and cosiders this phase as the best phase for the next code word boundary comparison. By way of example, at least three phases may be compared, e.g., at least one on either side of the best phase from the previous code word boundary. It is to be understood that decisions can be made on the samples while performing this phase selection or the interpolated samples corresponding to the best phase may be output to other signal processing circuitry and sophisticated detectors for making the decisions, thus enhancing performance even more.

The inventive techniques offer several orders of magnitude in performance improvement in detecting SAM and Gray data in the presence of RI and serves as a solution for next generation read channels. With appropriate modifications which may be realized by one skilled in the art given the inventive teachings herein, the techniques of the invention can be applied to any servo encoder.

Details of a digital interpolation based algorithm according to the invention for minimizing and/or eliminating effects of RI will now be given. In a first embodiment, a 2/8 encoding technique (also referred to as CODE 1) is used to illustrate the techniques of the invention. By way of example only, a magnetic recording system which may be modified such that the techniques of the invention are implemented therein is described in the above-referenced U.S. patent application identified as Ser. No. 09/338,104. Implementation of the inventive techniques with respect to other encoding systems will also be illustrated. For instance, implementations based on two other illustrative encoding techniques (referred to as CODE 2 and CODE 3) will also be provided below. However, it is to be understood that the invention is not limited to use with any particular encoding system or any transmission medium. Also, the following explanations will use the EPR4 target response and seven digital interpolators (as represented in Table 3 below) for the purposes of describing the invention. However, the invention is not limited to these illustrative parameters.

Shown in Table 3 are simple to implement digital interpolators (each embodied by a simple digital filter with four taps and a resolution of 1/16) which take the sampled signals at symbol rate and estimate samples in between the samples at symbol rate. It is to be appreciated that one interpolator is needed for each of the sampling points to be interpolated. Use of these interpolators on a T symbol rate signal results in interpolated values of very high accuracy (i.e., error variance is small) and can be easily implemented in digital processing circuitry. It is to be understood that the digital filters represented in Table 3 are for illustrative purposes only and, thus, the digital interpolators may be implemented in other embodiments with filters having other numbers of taps, other coefficient values, and other resolutions. Further, it is to be understood that the digital interpolators may be implemented by signal processing circuitry other than filters.

TABLE 3

Interpolators

| Interpolation at | Simple Digital Filters (Number of Taps: 4, Resolution: 1/16) | | | |
|---|---|---|---|---|
| T/8  | −1/16 | 2/16  | 15/16 | −1/16 |
| T/4  | −2/16 | 5/16  | 13/16 | −2/16 |
| 3T/8 | −2/16 | 7/16  | 11/16 | −2/16 |
| T/2  | −2/16 | 9/16  | 9/16  | −2/16 |
| 5T/8 | −2/16 | 11/16 | 7/16  | −2/16 |
| 3T/4 | −2/16 | 13/16 | 5/16  | −2/16 |
| 7T/8 | −1/16 | 15/16 | 2/16  | −1/16 |

Figure 5:
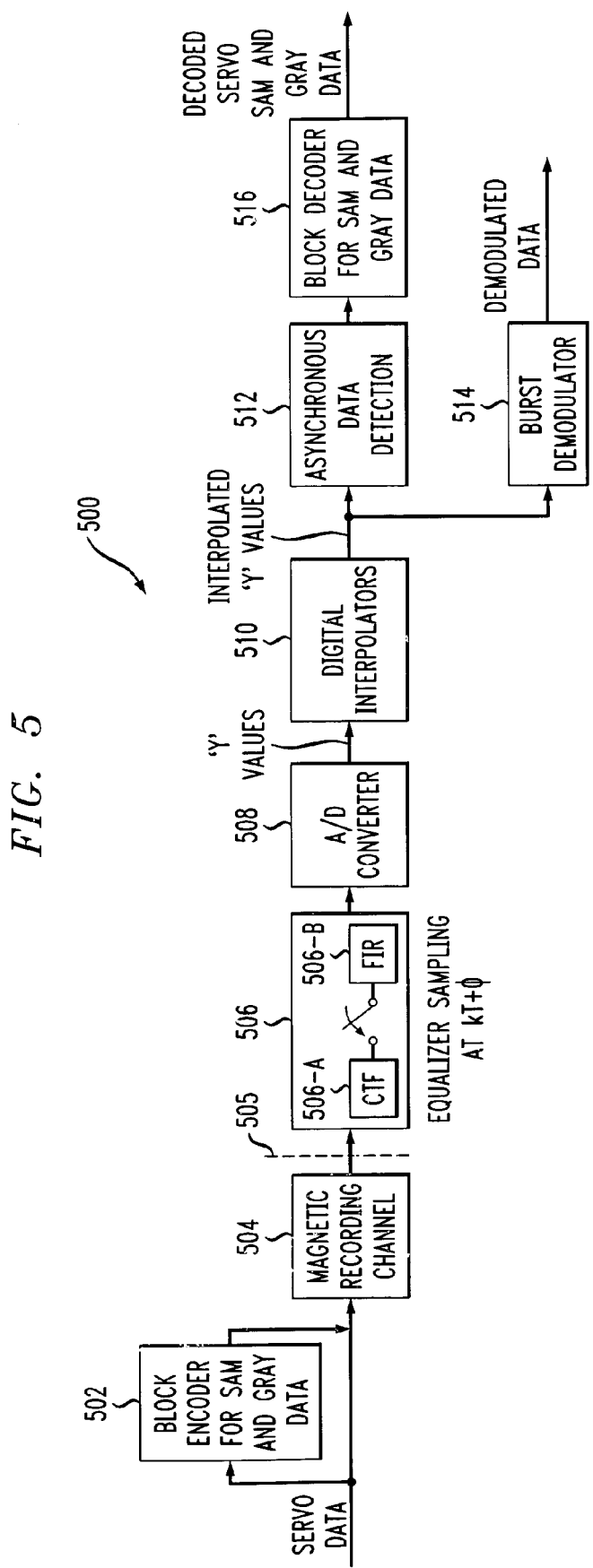
FIG. 5 is a block diagram illustrating a magnetic recording system according to an embodiment of the present invention.

Referring now to FIG. 5, a block diagram illustrates a magnetic recording system according to one embodiment of the present invention. It is to be understood that the system depicted in FIG. 5 is intended to illustrate the principles of the invention described above. Also, the system shown in FIG. 5 may be understood to, more broadly, represent a transmission system.

As shown, the magnetic recording system 500 comprises a servo data block encoder 502, a magnetic recording channel 504, an equalizer 506 with a continuous time filter (CTF) 506-A and a discrete time finite impulse response (FIR) filter 506-B, an analog-to-digital (A/D) converter 508, digital interpolators 510, an asynchronous data detector 512, a burst demodulator 514, and a servo data block decoder 516. It is assumed that the servo data has the same format as shown and described in the context of FIG. 2.

On the write side of operations, servo data is encoded by the block encoder 502 and written to a magnetic medium such as a disk (denoted as 505) via the magnetic recording channel 504. Encoding may be in accordance with a 2/8 encoding technique (CODE 1), with one of the other illustrative encoding techniques (CODE 2 or CODE 3), or with any other suitable encoding technique. Portions of the servo data that are not encoded may also be written to the medium 505. Again, it is understood that a magnetic write head, while not expressly shown, is functionally interposed between the magnetic recording channel 504 and the magnetic medium 505 for writing data to the medium.

On the read side of operations, the servo data is read from the magnetic medium 505 via a magnetic read head (not expressly shown but understood to be functionally interposed between the medium 505 and the equalizer 506) and then equalized in accordance with the equalizer 506. More specifically, a servo waveform corresponding to an encoded servo pattern is read back from the magnetic medium 505 and equalized by CTF 506-A and FIR filter 506-B, as is known.

The waveform is then digitized by the A/D converter 508, as is also known. The input to the A/D converter is a T symbol rate sampled target response equalized analog signal. It is to be understood that the techniques of the invention may be employed regardless of whether these T rate samples are asynchronously sampled or synchronously sampled with a conventional timing loop. The digital values at the output of the AID converter are referred to as the 'Y' values. These symbol rate samples from the A/D converter ('Y' values) are then interpolated using the digital interpolators 510. As mentioned above, in a preferred embodiment, there are seven digital interpolators, wherein the interpolators are implemented in accordance with Table 3 above. However, the invention is not limited to such a number, i.e., more or less digital interpolators may be employed.

The samples (interpolated 'Y' values) output by the digital interpolators 510 are then processed in an asynchronous manner in data detector 512 to detect the servo data. The block decoder 516 then decodes the detected data in accordance with the encoding technique implemented by the block encoder 502. The 'Y' values and/or the interpolated values are also used by the burst demodulator 514 to fine position the head to be on track.

Figure 6:
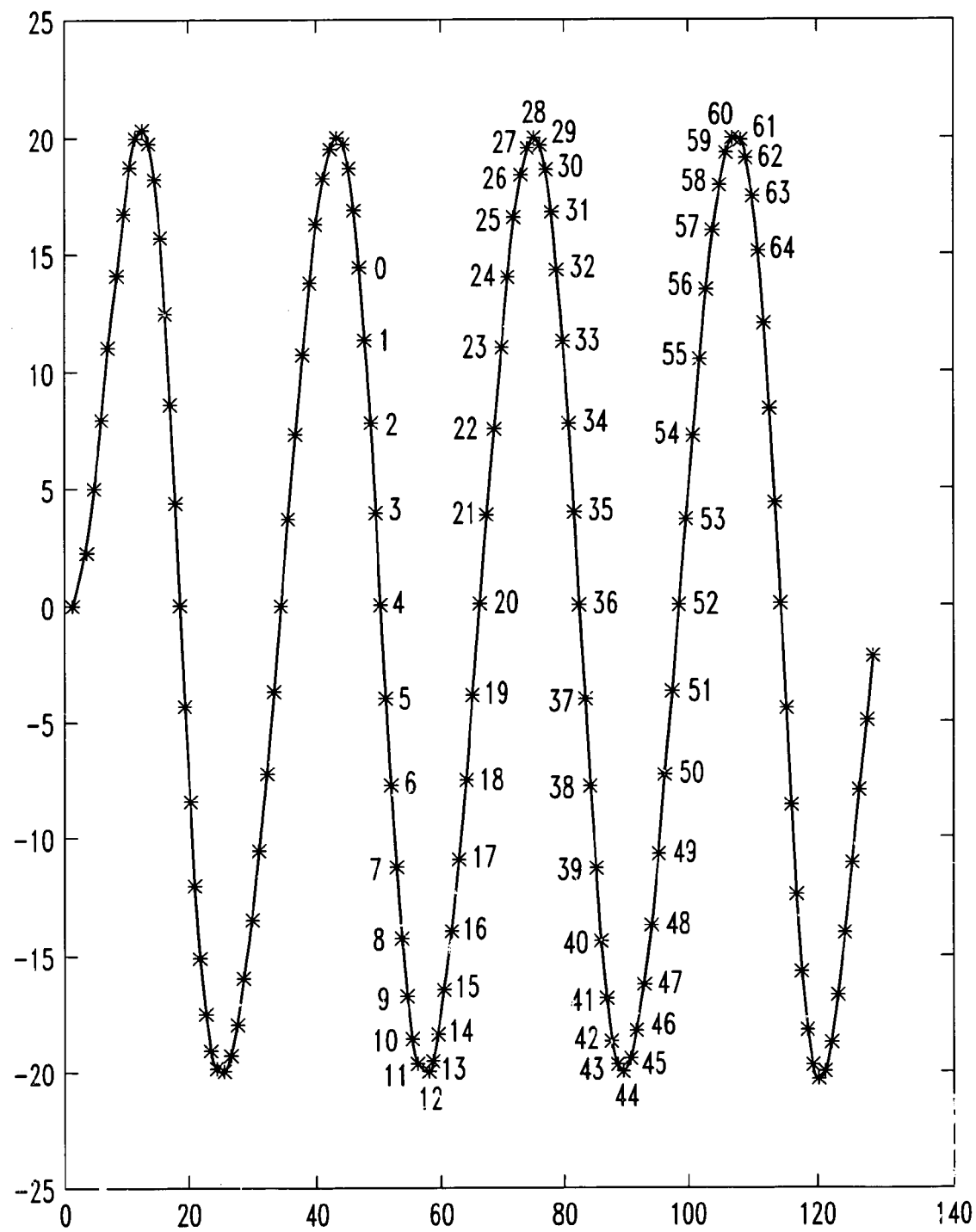
FIG. 6 is a diagram illustrating a signal interpolated according to an embodiment of the present invention.

FIG. 6 is a diagram illustrating a signal interpolated according to an embodiment of the present invention. More specifically, FIG. 6 shows an example of an interpolated 2T signal appearing at the output of the digital interpolator module 510 of FIG. 5. Seven digital interpolators are used in generating the signal represented in the figure. Samples and interpolated points are numbered for ease of explanation.

It is to be understood that the read side algorithm of the invention has to operate differently between preamble and servo data fields. This is because, as given in Table 1, it is known what the sample values ideally should be in the preamble field. This initial portion is termed as the "acquire" mode of the algorithm. After the acquire mode, SAM and Gray servo data is detected and decoded. This mode (after acquire) is termed the "tracking" mode.

Figure 7:
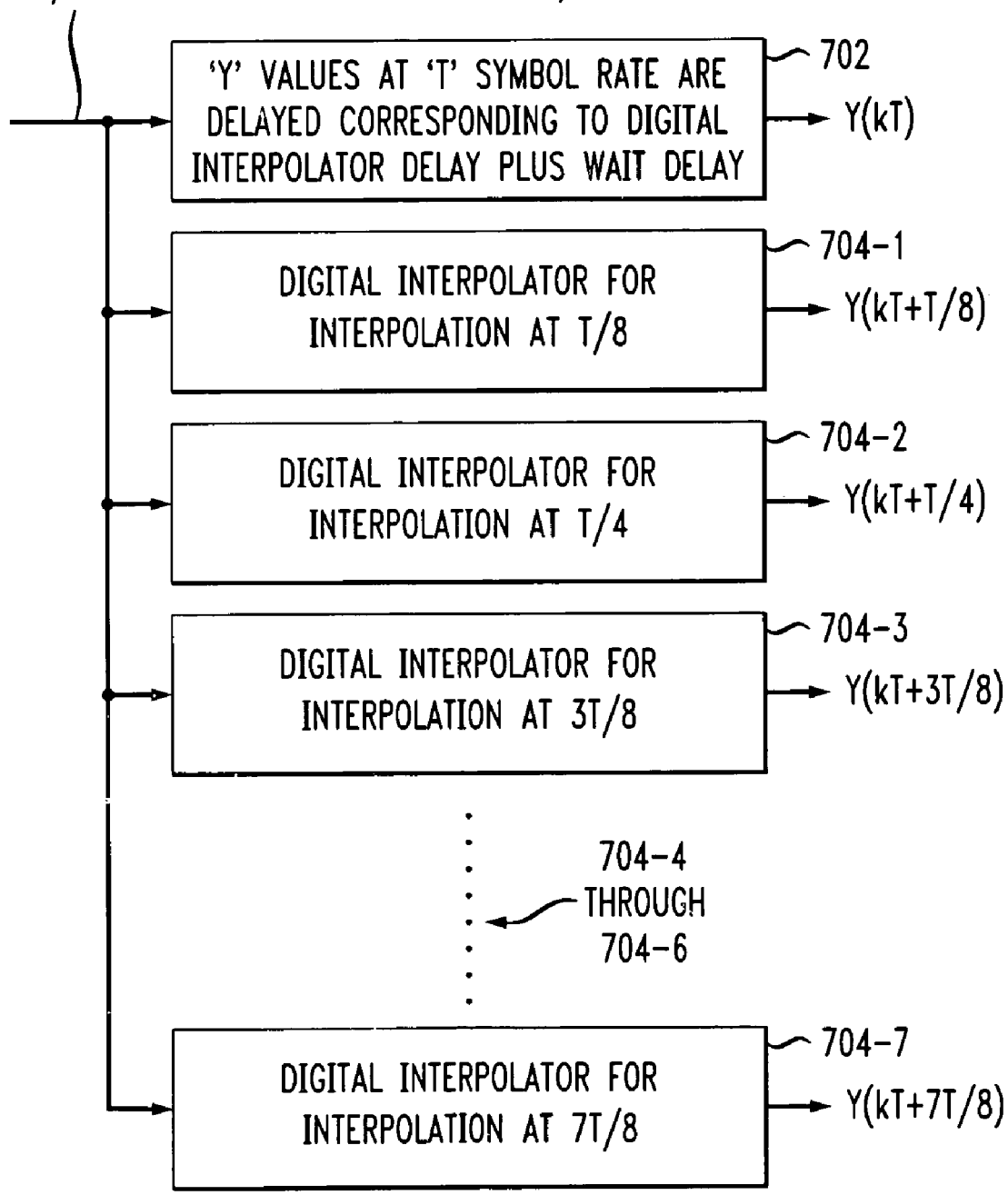
FIG. 7 is a flow diagram illustrating generation of interpolated values according to an embodiment of the present invention.

Referring now to FIG. 7, a flow diagram illustrates generation of interpolated values according to an embodiment of the present invention. More specifically, FIG. 7 shows how the 'Y' values out of the A/D converter 508 at 'T' rate are interpolated by digital interpolators 510 to obtain the intermediate values at 'I·T/8' sampling instances for I=1, 2, 3, 4, 5, 6 and 7. In FIG. 7 and the following figures, Y(kT+I·T/8) refers to the sample value at time instances kT+I·T/8, where k=0, 1, 2, 3, . . . , and I=0, 1, 2, 3, 4, 5, 6 or 7. The T spaced sample values Y(kT) may be considered as the values coming out of the A/D converter with zero time shift relative to the interpolated values. Note that the algorithm requires only seven digital interpolators for T/8 resolution. These digital interpolators run at T rate. Hence, every T, an A/D sample and seven interpolated values are obtained.

Thus for every T, as shown in FIG. 7, the 'Y' value at T symbol rate is delayed in step 702 corresponding to a delay value associated with the digital interpolator module plus a wait delay to be explained below. Thus, step 702 yields Y(kT). Then, in steps 704-1 through 704-7, interpolated values Y(kT+T/8), Y(kT+T/4), Y(kT+3T/8), Y(kT+T/2), Y(kT+5T/8), Y(kT+3T/4) and Y(kT+7T/8) are respectively generated (704-4 through 704-6 are not expressly shown for the sake of simplicity of the flow diagram).

Consider FIG. 6 again to further clarify this operation. Assume samples "16," "24," "32" and "40" are received from the A/D converter. These are the 'Y' values at 'T' rate. These four A/D samples are passed through the seven digital interpolators (Table 3) to get the seven interpolated intermediate sample values "25" through "31." Note that "25" is T/8 apart from "24" and that "31" is 7T/8 apart from "24." Also note that to get the interpolated values "25" through "31," the system waits at least 2T after sample "24"0 is received from the A/D converter in order to get the rest of the samples "32" and "40" to pass them through the interpolators. This delay together with the digital interpolation filter implementation delay are used to line up the 'Y' values from the A/D converter to the interpolated values from the interpolators.

Figure 8:
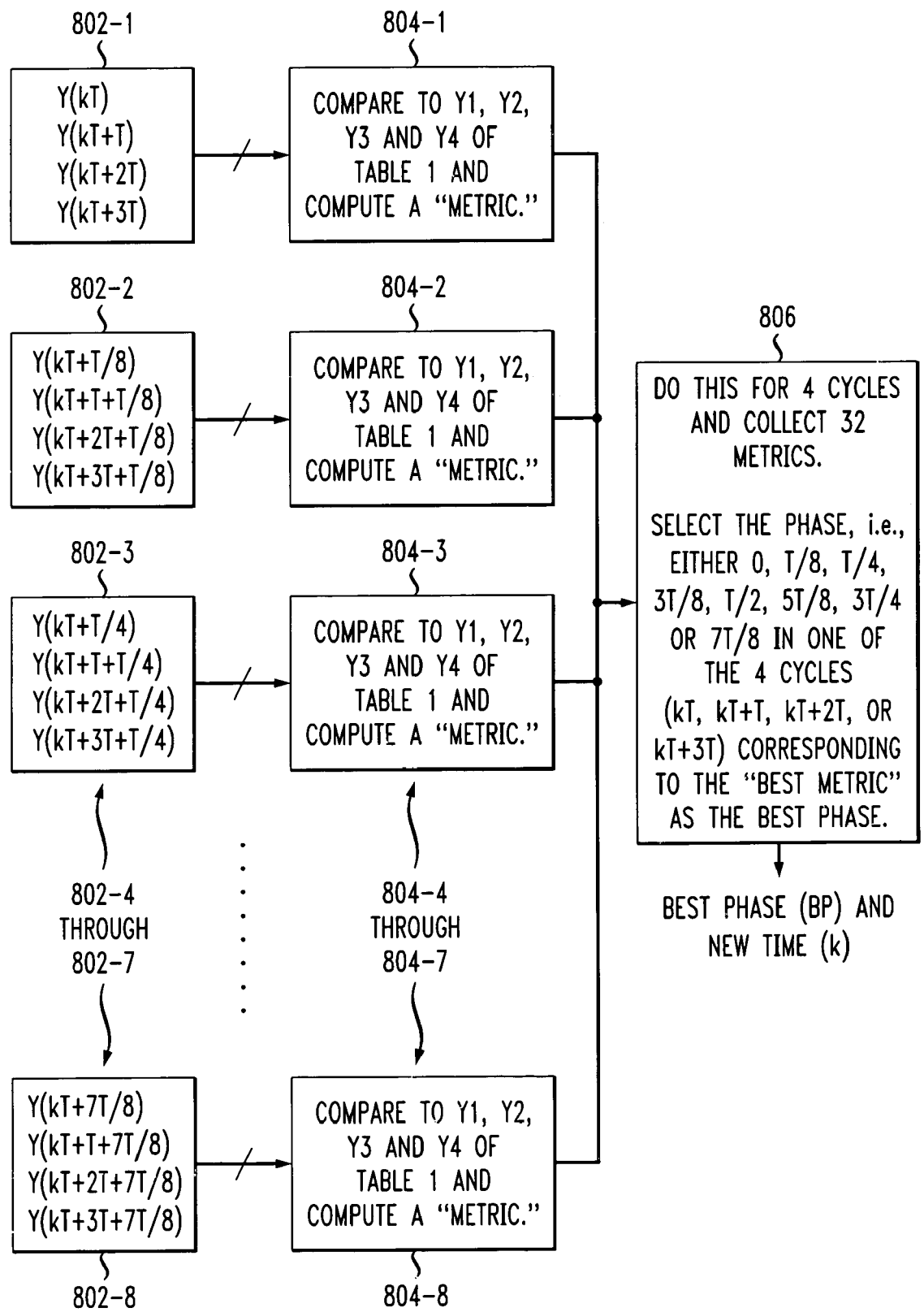
FIG. 8 is a flow diagram illustrating selection of an optimum phase in an acquire mode according to an embodiment of the present invention.

Referring now to FIG. 8, a flow diagram illustrates selection of an optimum phase (best phase) in an acquire mode according to an embodiment of the present invention. It is to be understood that data detector 512 (FIG. 5) preferably performs the various selection and tracking functions described herein. More specifically, FIG. 8 shows system operation during the initial portion of the acquire mode. First, the algorithm locks on to a best phase as follows. The algorithm works on the interpolated 2T field and tries to lock on to the phase corresponding to the desired 2T phase (say the phase corresponding to how the 2T pattern ends). For an EPR4 target response, as shown in Table 1, the phase corresponding to the preamble ending in 1100 results in [0 20 0 −20] as the ideal stream of values (Ideal Y values). For seven interpolators and an A/D sample, for example, any of the eight sub-phases in one of the 4T periods may be locked on to. Note that one of the interpolated sample phases may be selected as the best phase and that the phase corresponding to the sample from the A/D converter need not always be the best phase.

The invention is not limited to any particular locking technique. That is, locking metrics depend on the type of servo encoder and its constraints. One locking metric that may be employed comprises computing the sum of the absolute errors between samples and desired stream of values. The optimum or best metric in this case will be the minimum of those sums. Another locking metric that may be employed is peak value. Servo encoders may impose strong peaks at certain locations in the code word. Metrics for different phases (time instances) around the desired location can be the amplitudes of the samples at those locations (time instances). The optimum or best metric in this case would be the strongest peak.

As shown in FIG. 8, the algorithm compares (in steps 804-1 through 804-8, respectively) the four ideal 'Y' values (Y1, Y2, Y3 and Y4 of Table 1) to four 'Y' values from the A/D converter [Y(kT), Y(kT+T), Y(kT+2T) & Y(kT+3T)] (obtained in 802-1) and also to seven sets of four time shifted 'Y' values from each of the seven digital interpolators [Y(kT+I·T/8), Y(kT+T+I·T/8), Y(kT+2T+I·T/8) & Y(kT+3T+I·T/8), I=1, 2, 3, . . . 7] (obtained in 802-8, respectively) and computes a metric for each phase (i.e., each time shift). Thus far, eight metrics are obtained. The operation is repeated for three more cycles (T) so as to obtain 24 (3×8) more metrics. The algorithm then finds the best metric of the 32 metrics, in step 806. Then, the phase (i.e., either 0, T/8, T/4, 3T/8, T/2, 5T/8, 3T/4 or 7T/8) and the cycle time (i.e., either kT, kT+T, kT+2T or kT+3T) corresponding to the best metric is selected as the best phase (BP) and the reference time (k). As explained above, the criterion for selecting the best metric depends on the locking metric employed (e.g., sum of the absolute errors, peak value, etc.).

Note that in the notation used herein, 'k' is an integer representing different time instances. When the "next cycle" is referred to, this implies that k is incremented by 1. The algorithm may repeat the procedure outlined in FIG. 8 until consistent best phases are obtained, after which the algorithm moves on to tracking the best phase as shown in FIG. 9.

Figure 9:
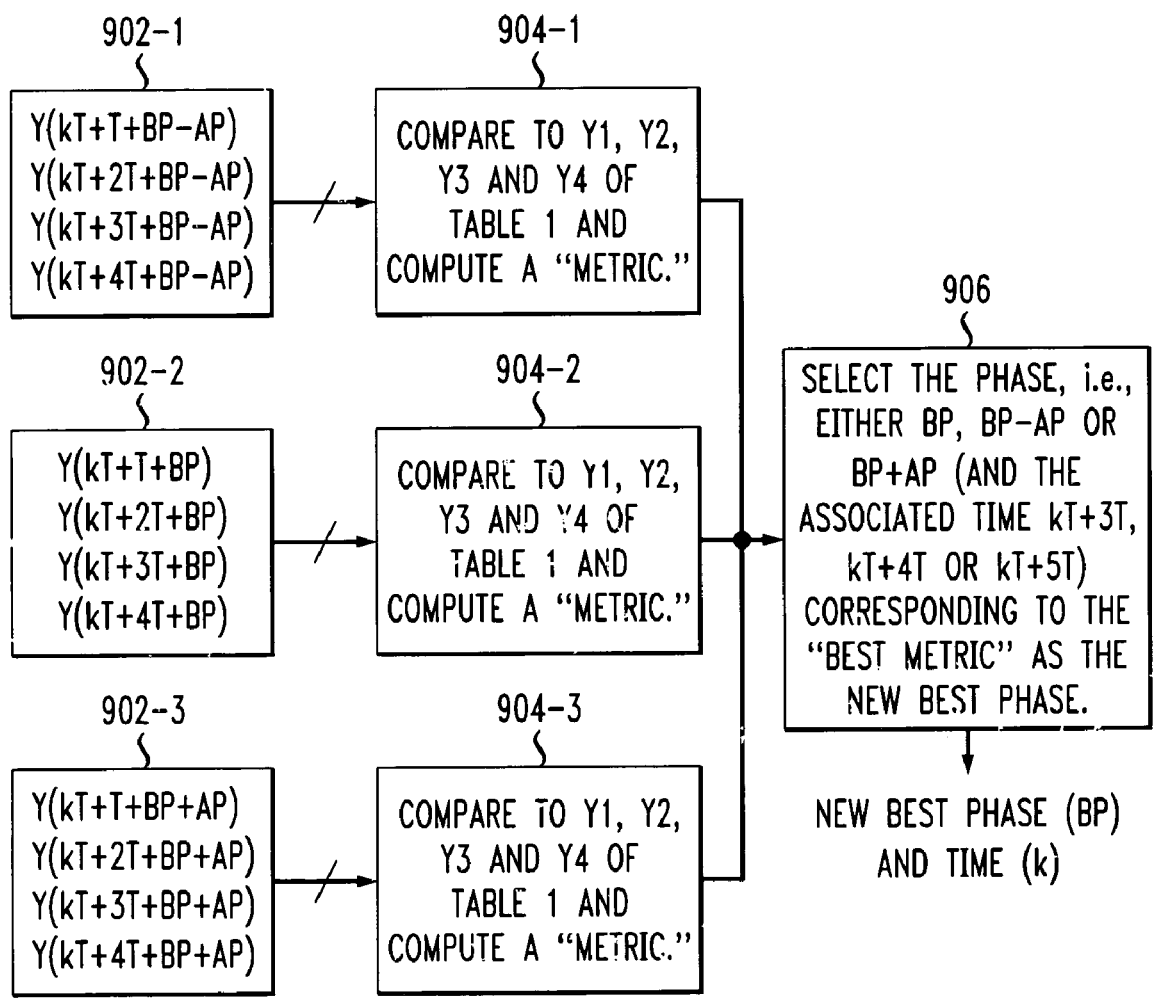
FIG. 9 is a flow diagram illustrating tracking of an optimum phase in an acquire mode according to an embodiment of the present invention.

Referring now to FIG. 9, a flow diagram illustrates tracking of an optimum phase in an acquire mode according to an embodiment of the present invention. In accordance with FIG. 9, the adjacent phase (AP) is defined as the phase adjacent to the best phase. Assume that the phase corresponding to T/8 apart from the best phase is taken as the adjacent phase. If 5T/8 is the best phase (BP), for example, then the adjacent phases would be 5T/8−T/8=4T/8 (BP−AP) and 5T/8+T/8=6T/8 (BP+AP).

Once the starting best phase (BP) and the reference time (k) are known, as determined in accordance with FIG. 8, the algorithm compares (step 904-2) the four ideal 'Y' values (Y1, Y2, Y3 and Y4 of Table 1) to four samples corresponding to the best phase [Y(kT+T+BP), Y(kT+2T+BP), Y(kT+3T+BP) and Y(kT+4T+BP)] (obtained in 902-2) and also compares (steps 904-1 and 904-3, respectively) the four ideal 'Y' values to four samples each corresponding to adjacent phases (AP) on either side of the best phase [Y(kT+T+BP+/−AP), Y(kT+2T+BP+/−AP), Y(kT+3T+BP+/−AP) and Y(kT+4T+BP+/−AP)] (obtained in 902-1 and 902-3). As before, metric are also computed in steps 904-1 through 904-3, and a new best phase (BP) and a new starting reference time (k) are determined in step 906.

For example, if the adjacent phase (AP) is T/8, the algorithm compares the four ideal 'Y' values (Y1, Y2, Y3 and Y4 of Table 1) to the samples corresponding to the best phase, and to the phases that are respectively correspondent to +/−T/8 apart from the best phase. As before, the phase (BP, BP+AP or BP−AP) and the associated time (kT+3T, kT+4T or kT+5T) corresponding to the best metric of these comparisons is taken as the new best phase (BP) and the new starting reference time (k) for the next set of comparisons. The next set of comparisons is done on samples corresponding to the new best phase and to the new best phase +/− adjacent phases.

Note that these comparisons usually take place every 4T intervals and sometimes 5T intervals during the acquire mode. This is because all of the samples needed to perform these comparisons will be available only after the time instant kT+4T+BP+AP. In the extreme case, for example, if BP=7T/8 and AP=T/8, then kT+4T+BP+AP=kT+4T+T=kT+5T, indicating that sample corresponding to kT+4T+BP+AP will be available only after 5T from the reference time k.

Also note that the new reference time (k) corresponding to the new best phase will be either 3T, 4T or 5T intervals from the old reference time. Examples to further illustrate this point are given as follows. If BP−AP is selected as the new best phase and if BP=0 and AP=T/8, then kT+4T+BP−AP=kT+4T+0−T/8=kT+3T+7T/8. This indicates that the new reference be 3T from the old reference time and that the new best phase is 7T/8 in that time interval. If BP+AP is selected as the new best phase and if BP=7T/8 and AP=T/8, then kT+4T+BP+AP=kT+4T+7T/8 +T/8=kT+4T+T=kT+5T+0. This indicates that the new be 5T from the old reference time and that the new best phase is 0 in that time interval. For all other cases of BP and AP, the new reference time will be 4T from the old reference time. In general, BP−AP<0 indicates that the new reference time is 3T from the old reference time, BP+AP≧T indicates that the new reference time is 5T from the old reference time, and other cases mean that the new reference time is 4T from the old reference time.

The algorithm needs to detect the end of preamble to find out when the 4T preamble ends and when the 8 bit code word (2/8 servo encoder) begins. The end of preamble can be easily detected by passing out the interpolated values and samples corresponding to the best phases and adjacent sub-phases to the same circuitry used in the system for detecting the end of preamble.

Once the end of preamble is detected, an approach similar to that illustrated in FIG. 9 is used to track the phase after the preamble field and to detect servo data. This is illustrated in FIG. 10.

Figure 10:
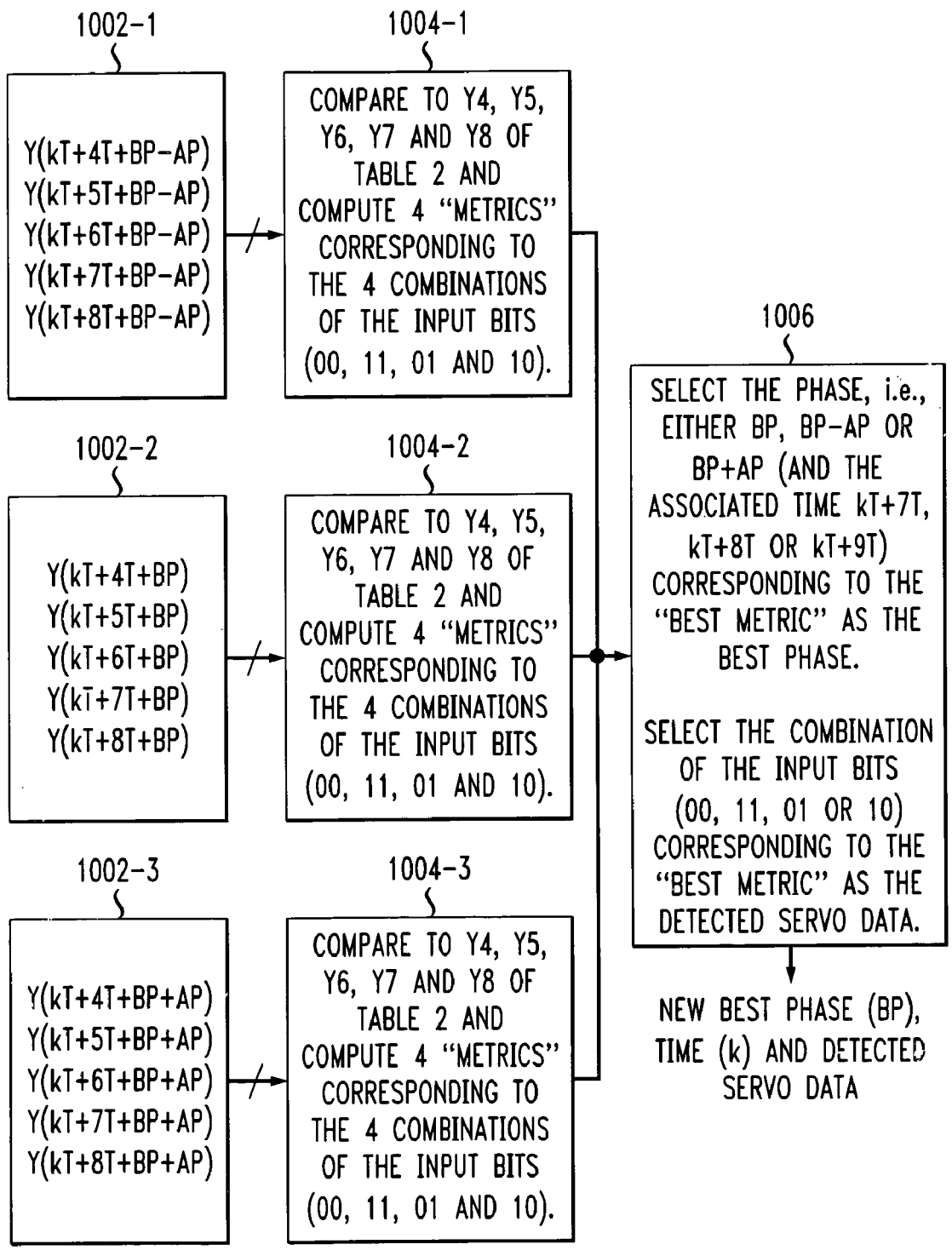
FIG. 10 is a flow diagram illustrating data detection and tracking of an optimum phase after an acquire mode for a first encoding technique according to an embodiment of the present invention.

Referring now to FIG. 10, a flow diagram illustrates data detection and tracking of an optimum phase after an acquire mode for a first encoding technique according to an embodiment of the present invention. Recall that the ideal 'Y' value stream corresponding to different combinations of the input bits for 2/8 code and EPR4 target response are tabulated in Table 2. Since EPR4 has a channel memory of three, only five out of eight ideal 'Y' values are known for all combinations of two input bits. Thus, the ideal 'Y' values (Y4, Y5, Y6, Y7 and Y8) are known for all combinations of two input bits for a 2/8 servo encoder.

Now, the algorithm performs comparisons every kT+8T+BP+AP time instances in tracking mode (instead of every kT+4T+BP+AP time instances with respect to the preamble). Note that the best phase coming out of the previous set of comparisons is treated as the reference best phase for the next set of comparisons. As shown in FIG. 10, the algorithm compares (step 1004-2) the five ideal 'Y' values (Y4, Y5, Y6, Y7 and Y8 of Table 2) to five samples correspond to the best phase [Y(kT+4T+BP), Y(kT+5T+BP), Y(kT+6T+BP), Y(kT+7T+BP) and Y(kT+8T+BP)] (obtained in 1002-2) and also compares (steps 1004-1 and 1004-3, respectively) ideal 'Y' values to five samples each corresponding to adjacent phases on either side of the best phase [Y(kT+4T+BP+/−AP), Y(kT+5T+BP+/−AP), Y(kT+6T+BP+/−AP), Y(kT+7T+BP+/−AP) and Y(kT+8T+BP+/−AP )] (obtained in 1002-1 and 1002-3, respectively). As before, metrics are also computed in steps 1004-1 through 1004-3, and a new best phase (BP) and a new starting reference time (k) are determined in step 1006.

More specifically, the phase (BP, BP+AP or BP−AP) and the associated time (kT+7T, kT+8T or kT+9T) corresponding to the best metric of these comparisons is taken as the new best phase (BP) and the new starting reference time (k) for the next set of comparisons. Basically, every time at the end of the code word boundary (8T+BP+AP for a 2/8 encoder), the algorithm locks on to the best possible phase corresponding to the best metric. By doing this, the algorithm of the invention responds to the phase changes caused by RI by locking on to different best phases every time this comparison is performed.

Note that these comparisons take place at the furthermost point in time, i.e., kT+8T+BP+AP. Depending on the values of BP and AP, the associated time corresponding to best metric could be kT+7T, kT+8T or kT+9T. Because, BP−AP<0 refers to cycle time kT+7T, BP+AP≧T refers to cycle time kT+9T, and other cases refer to cycle time kT+8T.

For detecting the servo data, the algorithm performed by the system of FIG. 5 can make the detection decision on the input samples while tracking the phase. Alternatively, the "cleaned" samples (corresponding to the best phase selected) may be passed out to other servo data detection circuitry (e.g., Viterbi decoder as shown in FIG. 1) for further improvement in performance. The first approach is illustrated in FIG. 10. In this approach, the combination of the input bits (00, 11, 01 or 10) corresponding to the "best metric" of the comparisons is taken as the detected servo data. The second approach is illustrated in FIG. 11.

Figure 11:
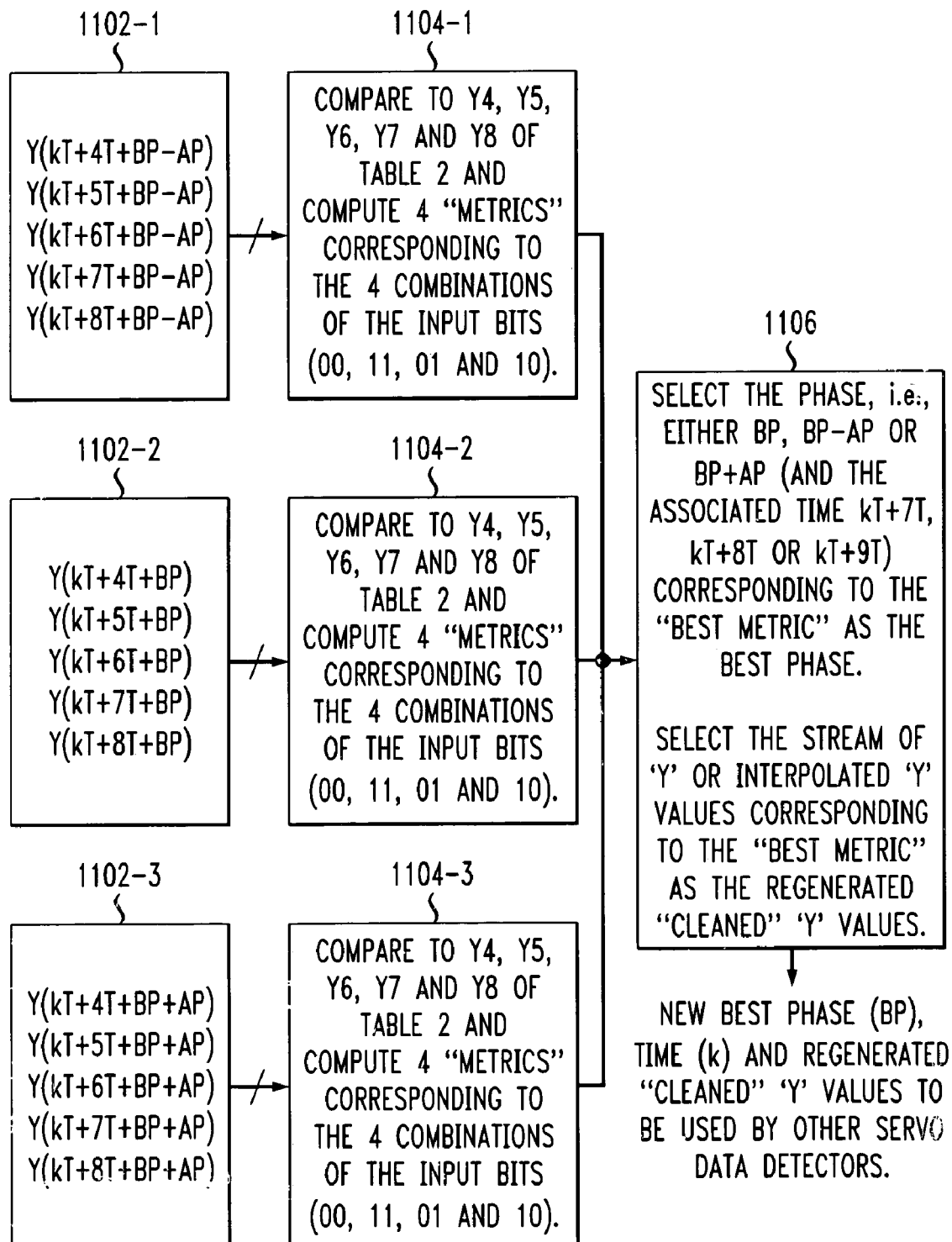
FIG. 11 is a flow diagram illustrating data detection and tracking of an optimum phase after an acquire mode for the first encoding technique according to another embodiment of the present invention.

Referring now to FIG. 11, a flow diagram illustrates data detection and tracking of an optimum phase after an acquire mode for the first encoding technique according to another embodiment of the present invention. It is to be appreciated that steps 1102-1 through 1102-3, steps 1104-1 through 1104-3, and step 1106 are identical to the corresponding steps in FIG. 10, with the following exception. In the approach of FIG. 11, the stream of 'Y' or interpolated 'Y' values corresponding to the "best metric" is taken as the regenerated "cleaned" 'Y' values. Cleaned values refer to samples that are generated in an approximate, properly sampled manner. This cleaned 'Y' value stream is then passed on to Viterbi or other sophisticated data detectors in step 1106.

In the following section, a servo encoder which maps a "0" to "1100" and a "1" to "0011" is considered. Also, a description is provided of how the above-described read side algorithm can be modified to operate for this encoder. It is to be appreciated that the acquire portion of the algorithm is identical to the acquire mode described above. After acquire mode, phase tracking and servo data detection may be performed as illustrated in FIG. 12.

Figure 12:
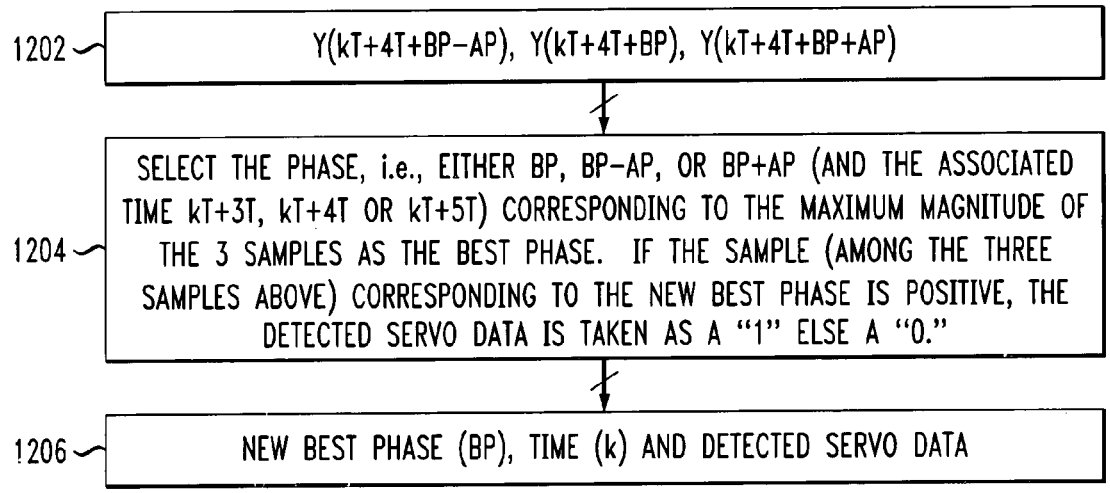
FIG. 12 is a flow diagram illustrating data detection and tracking of an optimum phase after an acquire mode for a second encoding technique according to an embodiment of the present invention.

Referring now to FIG. 12, a flow diagram illustrates data detection and tracking of an optimum phase after an acquire mode for a second encoding technique according to an embodiment of the present invention. This second code (CODE 2) produces a strong positive or negative peak at the code word boundary. As shown in FIG. 12, at the end of the code word boundary, i.e., at kT+4T+BP+AP time instance, three sample values corresponding to the best phase and its adjacent phases [Y(kT+4T+BP−AP), Y(kT+4T+BP) and Y(kT+4T+BP+AP)] are considered (obtained in 1202).

In step 1204, the algorithm then selects the phase, i.e., either BP, BP−AP or BP+AP (and the associated time kT+3T, kT+4T or kT+5T), corresponding to the maximum magnitude of the three samples as the new best phase (BP) and the new reference time (k). If the sample (among the three samples) corresponding to the new best phase is positive, the detected servo data is taken as a logic value "1." Otherwise, the servo data is detected as a logic value "0." The algorithm outputs the new best phase (BP), the new reference time (k) and the detected servo data, in step 1206.

In this next section, yet another servo encoder is considered. This encoder maps a "0" to "0000" and a "1" to "0011." Also, a description is provided of how the above-described read side algorithm can be modified to operate for this encoder. It is to be appreciated that the acquire portion of the algorithm is identical to the acquire mode described above. After acquire mode, phase tracking and servo data detection may be performed as illustrated in FIG. 13.

Figure 13:
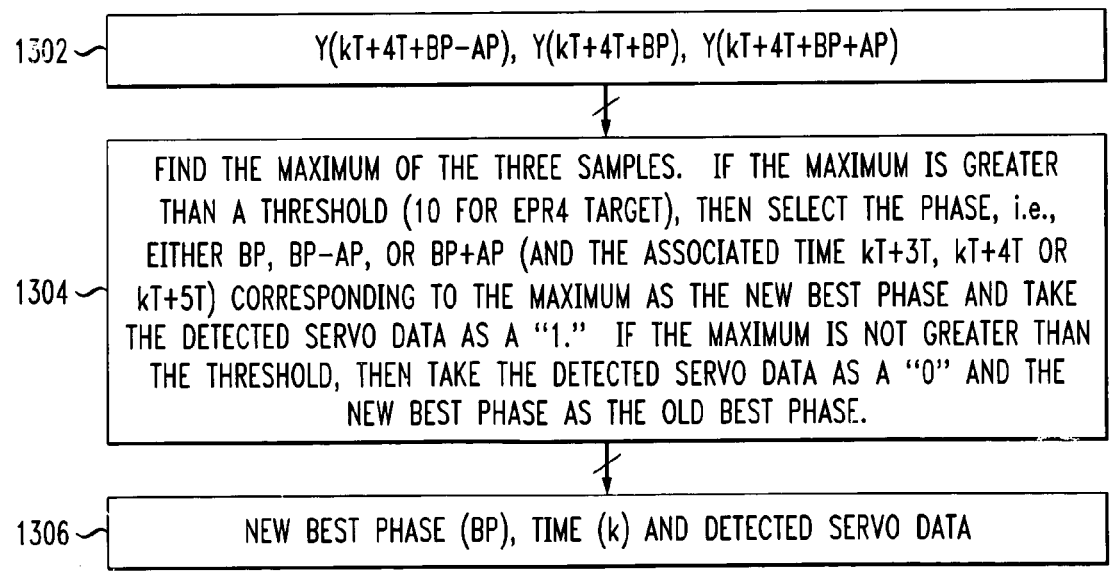
FIG. 13 is a flow diagram illustrating data detection and tracking of an optimum phase after an acquire mode for a third encoding technique according to an embodiment of the present invention.

Referring now to FIG. 13, a flow diagram illustrates data detection and tracking of an optimum phase after an acquire mode for a third encoding technique according to an embodiment of the present invention. This third code (CODE 3) produces a positive peak or a zero at the code word boundary. As shown in FIG. 13, at the end of the code word boundary, i.e., at kT+4T+BP+AP time instance, three sample values corresponding to the best phase and its adjacent phases [Y(kT+4T+BP−AP), Y(kT+4T+BP) and Y(kT+4T+BP+AP)] are considered (obtained in 1302).

In step 1304, the algorithm finds the maximum of the three samples. If the maximum is greater than a threshold (e.g., ten for EPR4 target), then the algorithm selects the phase, i.e., either BP, BP−AP or BP+AP (and the associated time kT+3T, kT+4T or kT+5T), corresponding to the maximum as the new best phase and new reference time (k), and takes the detected servo data as a logic "1." If the maximum is not greater than the threshold, then the algorithm takes the detected servo data as a logic "0" and the new best phase as the old best phase without any update. The algorithm outputs the new best phase (BP), the new reference time (k) and the detected servo data, in step 1306.

It is to be understood that while FIGS. 12 and 13 illustrate detection of the servo data, regenerated cleaned Y values may be alternatively passed on to other servo data detectors, similar to step 1106 of FIG. 11.

Figure 14:
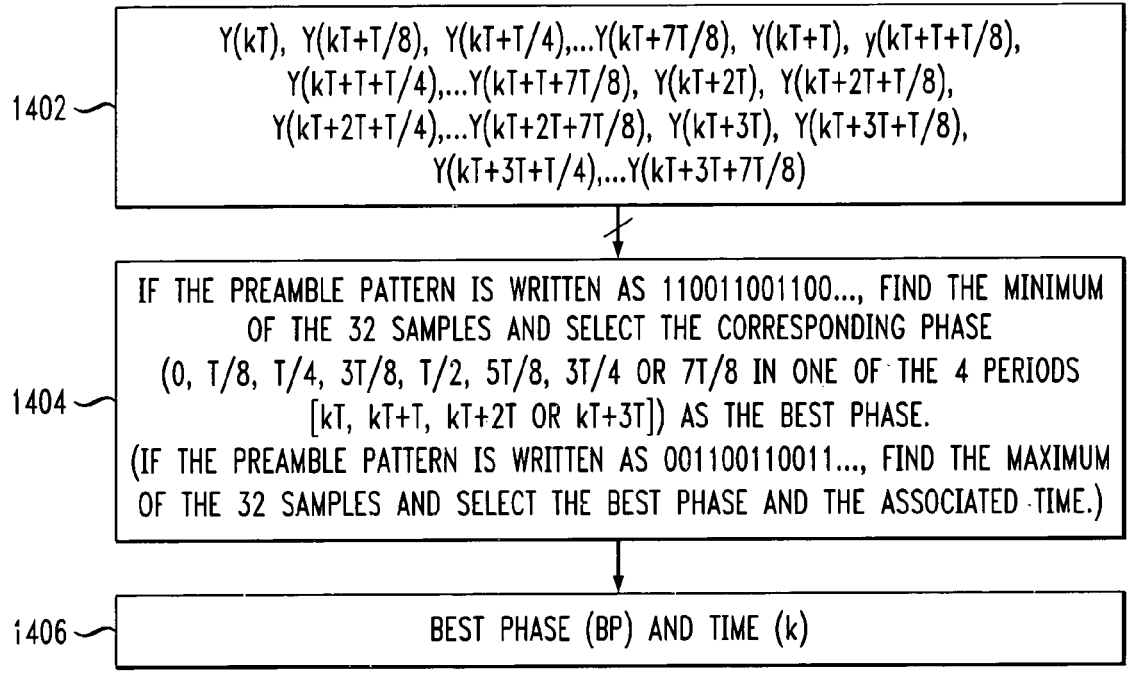
FIG. 14 is a flow diagram illustrating selection of an optimum phase in an acquire mode according to another embodiment of the present invention.

Referring now to FIG. 14, a flow diagram illustrates selection of an optimum phase in an acquire mode according to another embodiment of the present invention. In this embodiment, the algorithm takes (step 1402) 32 sample values corresponding to an entire sine wave (4T wide) in the preamble field. These sample values are denoted as Y(kT), Y(kT+T/8), Y(kT+T/4), . . . Y(kT+7T/8), Y(kT+T), Y(kT+T+T/8),Y(kT+T+T/4), . . . Y(kT+T+7T/8), Y(kT+2T+T/8), Y(kT+2T+T/4), . . . , Y(kT+2T+7T/8), Y(kT+3T), Y(kT+3T+T/4), . . . Y(kT+3T+7T/8). If the preamble pattern is written as 110011001100. . . , the algorithm finds the minimum of the 32 samples and selects the corresponding phase (0, T/8, T/4, 3T/8, T/2 , 5T/8, 3T/4 or 7T/8 in one of the 4 periods [kT, kT+T, kT+2T or kT+3T]) as the best phase (BP) and the corresponding time as the starting reference time (k), in step 1404. If the preamble pattern is written as 001100110011. . . , then the algorithm finds the maximum of the 32 samples and selects the best phase and the associated time. The algorithm outputs the new best phase (BP) and the new reference time (k), in step 1406.

Figure 15:
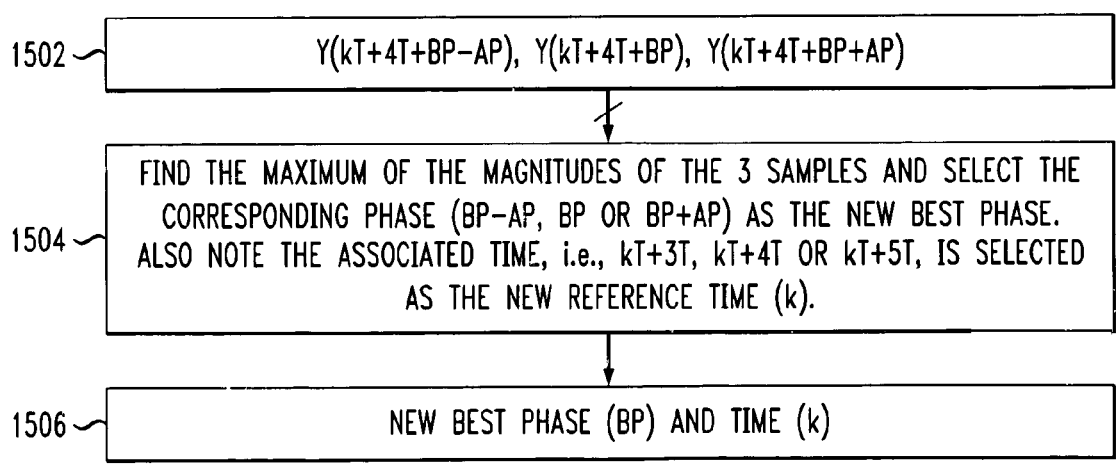
FIG. 15 is a flow diagram illustrating tracking of an optimum phase in an acquire mode according to another embodiment of the present invention.

Referring now to FIG. 15, a flow diagram illustrates tracking of an optimum phase in an acquire mode according to another embodiment of the present invention. At every kT+4T+BP+AP time instance, the algorithm finds the maximum of the magnitudes of the three samples [Y(kT+4T+BP–AP), Y(kT+4T+BP), Y(kT+4T+BP+AP)] (obtained in 1502) and selects the corresponding phase (BP–AP, BP or BP+AP) as the new best phase, in step 1504. Also, the associated time, i.e., kT+3T, kT+4T or kT+5T is selected as the new reference time (k). The algorithm outputs the new best phase (BP) and the new reference time (k), in step 1506.

It is to be understood that the adjacent phase may be a fraction or a multiple of T. In previous illustrative explanations, T/8 was used as the adjacent phase. However, the algorithm may use other phases, e.g., T/4 or 2T, for the adjacent phase. Also, while illustratively explaining the invention above, the algorithm compared samples corresponding to the best phase and the best phase +/–adjacent phase. Alternatively, the algorithm phase +/– adjacent phase 1 and best phase +/– adjacent phase 2 with additional implementation complexity. Hence, the algorithm of the invention may compare samples corresponding to multiple adjacent phases relative to the best phase.

It is to be further understood that the functional elements of the read side of the magnetic recording system 500 in FIG. 5 may be implemented in accordance with a processor and associated memory. That is, one or more of the equalizer 506, the digital interpolators 510, the data detector 512, the burst demodulator 514 and the block decoder 516 may be implemented as such. The processor and memory may preferably be part of a digital signal processor (DSP) used to implement the read channel. However, it is to be understood that the term "processor" as used herein is generally intended to include one or more processing devices and/or other processing circuitry. For example, the invention may be implemented as an application-specific integrated circuit (ASIC) or as another type of integrated circuit, e.g., a read channel integrated circuit. The term "memory" as used herein is generally intended to include memory associated with the one or more processing devices and/or circuitry, such as, for example, RAM, ROM, a fixed and removable memory devices, etc.

Accordingly, software components including instructions or code for performing the methodologies of the invention, as described herein, may be stored in the memory associated with the read channel processor and, when ready to be utilized, loaded in part or in whole and executed by one or more of the processing devices and/or circuitry of the read channel processor.

Advantageously, as explained in detail herein, the invention provides substantial improvement in the performance associated with servo data detection under adverse radial incoherence (RI). The digital interpolation based methodologies of the invention do not stress the sampling circuitry since there is no need to oversample the raw analog signal. The invention may be applied to any servo encoded system (encoder-independent schemes), with appropriate modifications as dictated by the encoder code constraints. Given the inventive teachings provided herein, such modifications are well within the skill level of the ordinary artisan.

Also, the servo data detection techniques of the present invention improve seek time in magnetic recording systems. That is, since the techniques of the invention effectively provide mechanisms for overcoming the quick phase changes and signal loss associated with radial incoherence, faster disk seeks are possible. Also, tracks can be written closer and the disks can be spun faster with the application of techniques of the present invention. Moreover, the mis-synchronization to the block boundaries caused by RI that affects the performance of conventional servo SAM detection is advantageously overcome with the application of techniques of the present invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of detecting data from input data obtained from a transmission medium, the method comprising the steps of:
    interpolating one or more samples from one or more samples generated from the input data at a given symbol rate, the one or more interpolated samples having one or more phases associated therewith which differ from a phase associated with the one or more samples generated at the given symbol rate; and
    selecting an optimum phase from the symbol rate phase and the one or more interpolated phases such that at least a portion of the one or more samples associated with the optimum phase are identified as representative of detected data.

2. The method of claim 1, wherein the transmission medium is a recording medium and the input data is control data.

3. The method of claim 2, wherein the input data is stored on tracks of the recording medium and the control data is detected therefrom in the presence of timing offsets existing between radially adjacent tracks of the recording medium.

4. The method of claim 2, wherein the detected control data is subsequently decoded.

5. The method of claim 4, wherein the decoded control data is subsequently used for reading information from the recording medium.

6. The method of claim 2, wherein the control data is at least one of preamble data and servo sector data stored on the recording medium.

7. The method of claim 1, wherein the optimum phase selection step is performed in accordance with a locking metric.

8. The method of claim 7, wherein the locking metric comprises a computation of a sum of absolute errors between samples.

9. The method of claim 7, wherein the locking metric comprises a determination of a peak value associated with samples.

10. The method of claim 1, further comprising the step of tracking the optimum phase by:
comparing ideal samples to one or more samples associated with the optimum phase and to one or more samples associated with at least one phase that is greater than or less than the optimum phase;
computing one or more metrics based on the comparisons; and
selecting an optimum metric such that the phase associated with the samples from which the optimum metric was computed is selected as a new optimum phase.

11. The method of claim 10, wherein the detected data is represented by the samples from which the optimum metric was computed.

12. The method of claim 1, further comprising the step of tracking the optimum phase by:
obtaining one or more samples associated with the optimum phase and one or more samples associated with at least one phase that is greater than or less than the optimum phase; and
selecting the phase associated with the sample having a maximum magnitude and identifying the phase as a new optimum phase.

13. The method of claim 1, further comprising the step of tracking the optimum phase by:
obtaining one or more samples associated with the optimum phase and one or more samples associated with at least one phase that is greater than or less than the optimum phase;
selecting the phase associated with the sample having a maximum magnitude;
comparing the maximum magnitude to a threshold;
identifying the phase associated with the sample having the maximum magnitude as a new optimum phase when the maximum magnitude is greater than the threshold; and
retaining the optimum phase as the new optimum phase when the maximum magnitude is not greater than the threshold.

14. The method of claim 1, wherein one or more samples are passed on to at least one detector for detecting the data.

15. Apparatus for detecting data from input data obtained from a transmission medium, the apparatus comprising:
at least one processor operative to: (i) interpolate one or more samples from one or more samples generated from the input data at a given symbol rate, the one or more interpolated samples having one or more phases associated therewith which differ from a phase associated with the one or more samples generated at the given symbol rate; and (ii) select an optimum phase from the symbol rate phase and the one or more interpolated phases such that at least a portion of the one or more samples associated with the optimum phase are identified as representative of detected data.

16. The apparatus of claim 15, wherein the transmission medium is a recording medium and the input data is control data.

17. The apparatus of claim 16, wherein the input data is stored on tracks of the recording medium and the control data is detected therefrom in the presence of timing offsets existing between radially adjacent tracks of the recording medium.

18. The apparatus of claim 16, wherein the control data is at least one of preamble data and servo sector data stored on the recording medium.

19. The apparatus of claim 15, wherein the optimum phase selection operation is performed in accordance with a locking metric.

20. The apparatus of claim 15, wherein the at least one processor is further operative to track the optimum phase by: (i) comparing ideal samples to one or more samples associated with the optimum phase and to one or more samples associated with at least one phase that is greater than or less than the optimum phase; (ii) computing one or more metrics based on the comparisons; and (iii) selecting an optimum metric such that the phase associated with the samples from which the optimum metric was computed is selected as a new optimum phase.

21. The apparatus of claim 15, wherein the at least one processor is further operative to track the optimum phase by: obtaining one or more samples associated with the optimum phase and one or more samples associated with at least one phase that is greater than or less than the optimum phase; and selecting the phase associated with the sample having a maximum magnitude and identifying the phase as a new optimum phase.

22. The apparatus of claim 15, wherein the at least one processor is further operative to track the optimum phase by: obtaining one or more samples associated with the optimum phase and one or more samples associated with at least one phase that is greater than or less than the optimum phase; selecting the phase associated with the sample having a maximum magnitude; comparing the maximum magnitude to a threshold; identifying the phase associated with the sample having the maximum magnitude as a new optimum phase when the maximum magnitude is greater than the threshold; and retaining the optimum phase as the new optimum phase when the maximum magnitude is not greater than the threshold.

23. Apparatus for detecting data from input data obtained from a transmission medium, the apparatus comprising:
a digital interpolator module for interpolating one or more samples from one or more samples generated from the input data at a given symbol rate, the one or more interpolated samples having one or more phases associated therewith which differ from a phase associated with the one or more samples generated at the given symbol rate; and
a detection module, operatively coupled to the digital interpolator module, for selecting an optimum phase from the symbol rate phase and the one or more interpolated phases such that at least a portion of the one or more samples associated with the optimum phase are identified as representative of detected data.

24. An integrated circuit for detecting data from input data obtained from a transmission medium, the integrated circuit operative to perform operations comprising:
interpolating one or more samples from one or more samples generated from the input data at a given symbol rate, the one or more interpolated samples having one or more phases associated therewith which differ from a phase associated with the one or more samples generated at the given symbol rate; and
selecting an optimum phase from the symbol rate phase and the one or more interpolated phases such that at least a portion of the one or more samples associated with the optimum phase are identified as representative of detected data.

* * * * *